Patented May 13, 1941

2,241,397

UNITED STATES PATENT OFFICE 2,241,397

HIGH VISCOSITY CELLULOSE ETHERS

Charles R. Fordyce and Joseph Gail Stampfli, Rochester, N. Y., assignors to Eastman Kodak Company, Rochester, N. Y., a corporation of New Jersey No Drawing. Application February 13, 1937, Serial No. 125,644

12 Claims. (Cl. 260—231)

Our invention relates to cellulose ethers having a viscosity of at least 5000 centipoises, the method of preparing those ethers and colloidized products, such as sheeting prepared therefrom.

The general impression has been that the low viscosity cellulose ethers were particularly suitable for various products. Even in cases where ethers having a medium viscosity were prepared, the art has taught the reduction of the viscosity of those ethers to adapt them for the preparation of colloidized products. Film or sheeting prepared from these low viscosity ethers has been characterized by low tensile strength and poor flexibility and hence has never been considered in the same category as sheeting prepared from cellulose nitrate or cellulose acetate. The making of cellulose ethers has been known for a good many years but up to now they have had a viscosity on the order of 1000 centipoises or less and the sheeting prepared therefrom has been characterized by its weakness.

One object of our invention is to provide cellulose ethers which will produce colloidized products having a tensile strength and flexibility comparable to that of products prepared from cellulose esters. Another object of our invention is to provide a process for making cellulose ethers the ethoxy content of which is uniform throughout. Other objects of our invention will appear herein. We have found that ethyl cellulose, having a viscosity of not less than 5000 centipoises in a 10% solution of toluene-ethanol (2:1) at 25° C. when formed into films or sheets, will give a product having properties comparable to a like product prepared from cellulose acetate or cellulose nitrate, particularly as regards tensile strength which has been an outstanding weakness of the cellulose ether art up to the present time. It is preferred that the cellulose ether have a viscosity of 20,000–50,000 centipoises, the viscosity being limited only for practical reasons. For instance, viscosities of over 100,000 centipoises would involve extremely viscous solutions which would be more difficult to utilize commercially.

We have found that these high viscosity ethers can be produced by etherifying cellulose having a cuprammonium viscosity of 20–5000 centipoises in a dope etherification process in which the reaction mixture is not allowed to become acid. The time used to prepare the cellulose ether must take into account the temperature of the reaction which in turn must take into account the viscosity of the cellulose employed as the starting material.

We have found that a high viscosity ether may be prepared in a reaction mixture in which it dissolves thereby assuring uniformity of the product and of the ethoxy content and facilitating the handling thereof. In our process, as the ether is formed, it goes into solution thereby allowing the etherification to take place easily and upon all of the cellulose present without extending the time of treatment. Because the cellulose ether goes into solution, uniformity of the ethoxyl content is assured. Our process, which we have found makes possible the preparation of cellulose ethers having a viscosity not less than 5000 centipoises, is carried out as follows:

A cellulose including refined cotton linters or sulfite wood pulp having a cuprammonium viscosity of 20–5000 centipoises, is thoroughly soaked in a solution of alkali whose concentration is at least 40% preferably 50%, after which the cellulose is separated from as much of the alkali as can be removed by centrifuging or pressing. If the cellulose has been treated with a solution of less than 40% concentration, further alkali in dry form should be added to the cellulose before its treatment with the etherification bath. If the treatment has been with an alkali of more than 40% concentration, the adding of further alkali in dry form is optional. The amount of alkali used should be sufficient to prevent the etherification mixture from becoming acid. If the ethyl chloride is to be depended upon for the dissolving of the cellulose ether which is formed, the amount of alkali used should be not less than 1½ or more than 5 parts based on the weight of the cellulose. In other words, the presence of 1½—5 parts of alkali, based on the cellulose, should be present in the alkali cellulose which is etherified. Thereby some of the ethyl halide in the etherification mixture is converted by the alkali to alcohol. This alcohol-ethyl halide mixture is a solvent for the cellulose ether formed in the reaction. If, however, a solvent for the cellulose ether is present in the etherification mixture, such as ethylene formal, a tertiary alcohol which is described and claimed in Clarke and Malm Patent No. 2,170,009, dated Aug. 22, 1939 or dioxan, the amount of alkali present need only be sufficient to assure an alkaline etherification mixture throughout the reaction. If desired, the alkali may be of a high strength thus making possible the removal of a large proportion of the alkali solution from the cellulose after its treatment, with sufficient alkali remaining to prevent the etherification going acid. In this way the moisture content of the alkali cellulose is reduced. The water present in the alkali cellulose promotes the hydrolysis of ethyl chloride in the etherification bath. If a solvent is added instead of depending upon the mixture of ethyl chloride and the alcohol formed therefrom for dissolving the cellulose ether it is even more desirable that the amount of water be low.

Instead of centrifuging or pressing off the alkali solution from the cellulose and then adding dry alkali to assure the presence of a minimum proportion of water in the etherification, the alkali may be incorporated in the cellulose by treating the cellulose with a hot alkali solution of high concentration, the high temperature permitting a more concentrated solution. After the cellulose has been thus treated, it may then be centrifuged and cooled. By this means the cellulose contains a minimum of moisture and the alkali is uniformly distributed therethru. We have found, however, that the tensile strength of the cellulose ether is less if the moisture content of the alkali cellulose is too low. Therefore, if maximum tensile strength is desired, the moisture content of the alkali cellulose should not be the lowest possible even though the additional moisture results in using up some of the ethyl chloride and thereby increases the ultimate cost of the resulting product.

In the treating of the cellulose with alkali it is preferred that the time of treatment be not too long as the cuprammonium viscosity of the cellulose may be affected. In some alkali treatments, a time of 17 hours has been employed without affecting the viscosity of the cellulose. Nevertheless as alkali treatments of more than 4–6 hours have been found to be unnecessary and as the cellulose is occasionally deleteriously affected by a long time of treatment, a short alkali treatment is advisable.

In the removal of the alkali from the alkali cellulose it is preferred that centrifuging be used as this removes more liquid than pressing and leaves the cellulose in a fluffier condition. If in the future, a device for removing the liquid from the alkali cellulose more effective than the centrifuge should develop it would probably displace the centrifuge for this purpose.

We have found that centrifuging for 10 minutes is usually sufficient to remove the excess liquid and form the alkali cellulose cake although this is a matter of choice with the individual operator. The amount of alkali retained by the cellulose upon centrifuging depends among other things upon the temperature prevailing when the centrifuging is carried out. For instance in cold weather starting with 150 lbs. of cellulose, an alkali cellulose cake was obtained of 700 lbs. while at milder temperatures starting with this same amount of cellulose, the alkali cellulose cakes could be centrifuged down to 650 lbs. or even less.

It is desirable that the alkali cellulose after the centrifuging be not exposed to the open air for any considerable length of time. For instance, if it is not going to be used within a few hours it is preferred that it be kept within an enclosed container. We have found that a prolonged exposure of the alkali cellulose to air results in reduction of the viscosity of the cellulose which may detrimentally affect the quality of the cellulose ether prepared therefrom.

After the alkali cellulose has been formed, it is then treated with the etherification bath comprising ethyl chloride under certain temperature conditions as will be more fully explained. If the etherification mixture depends upon the ethyl halide mixed with the alcohol formed therefrom for dissolving the cellulose ether, at least 6 parts of ethyl halide should be employed for each part by weight of the cellulose. The quantity of ethyl halide may be increased to as much as 20 parts or even more although it is not economical to use such large quantities of ethyl halide in the process. In a process depending upon the ethyl halide for dissolving the ether, it is necessary that sufficient alkali be present to convert enough of the ethyl halide to alcohol to produce a solvent mixture, at least 10% of which is alcohol. Therefore, the use of a considerable amount of ethyl halide should necessitate the use of a greater amount of alkali. Also with a too small amount of alkali there will be a greater tendency for the reaction mixture to become acid which we have found is not conducive to the obtaining of high viscosity cellulose ethers.

In order to prepare high viscosity ethers it is necessary that the etherification bath remain alkaline. This is assured in our process by having sufficient alkali present to neutralize the hydrohalide acid formed by the ethyl halide during the reaction. Another factor assuring a high viscosity ether is the limiting of the time of reaction. If the time is to be kept constant, the following temperatures will be employed. Obviously with the viscosity in the higher part of a range the temperature of reaction would probably be on the upper side of that specified. It is to be understood that these figures are only approximate and given for the general guidance of the individual operator.

| Viscosity of the cellulose | Reaction temperature, preferred |
|---|---|
| Centipoises | °C. |
| 20–25 | 100 |
| 25–100 | 110 |
| 100–500 | 120 |
| 500–1000 | 125 |
| 1000–5000 | 130 |

With the temperatures and viscosities given, the time of reaction to prepare a cellulose ether of maximum viscosity would be about 4–5 hours providing there was sufficient alkali present to assure an alkaline reaction mixture throughout. For instance, if a cellulose having a cuprammonium viscosity of 250 centipoises is etherified at 120° C. in a dope etherification, the reaction should only be allowed to go from 4 to 4½ hours to assure a product of high viscosity. If, however, a cellulose of 450 centipoises was employed, the temperature might be 1 or 2 degrees higher or else the time might be 5–5½ hours. A time of three hours might be a little too short to completely dissolve the product in the reaction mixture. If the time is lengthened, for instance beyond 5½ hours, the viscosity will start to drop slowly if the bath is alkaline and more rapidly if it has become neutral or acid.

The temperature of etherification is 100°–130° C. and is selected in accordance with the viscosity of the cellulose material used and the time allowed for etherification.

The time of treatment may be from 4–10 hours to get a solution viscosity of 5000–100,000 centipoises. For instance, if a cellulose ether, having a very high viscosity, results at the end of 4½ hours, it may be advisable to continue the reaction for a longer time to get a produce having a viscosity within the preferred range of 20,000–50,000 centipoises. If, however, it is desired to adjust the time instead of the temperature for a cellulose of a given viscosity the usual rule is that, as the viscosity of the cellulose increases for a given temperature of etherification, the time likewise should increase. For instance, if a temperature of 120° C. was employed in the etherification of a cellulose having a viscosity of 2000 centiposes, it would take 8 or 10 hours to obtain the desired product and possibly even longer to obtain a cellulose ether having the preferred viscosity. If a cellulose, having a viscosity of 50 approximately 50 centiposes, is etherified at 120° C. the time necessary would be approximately 3½–4 hours. It may be stated as an approximation to guide the operator that an increase of temperature of 10° C. will double the rate of reaction so that from the table given above, the approximate time for etherification with a cellulose of any given viscosity may be determined.

If some additional solvent, such as dioxan, or a tertiary alcohol is employed in the etherification mixture, a slightly higher temperature is advisable. With the use of a solvent the rate of etherification is usually less so that a longer time of reaction will be desirable. Also, if a propyl halide such as propyl chloride is used instead of an ethyl halide it is desirable to slightly increase both the temperature and time to obtain the best results.

If the temperature of an etherification bath is allowed to remain too high the reaction mass will become acid in a much shorter time which is unfavorable to the formation of high viscosity ethers. If, on the other hand, the temperature is too low, doping will not take place with cellulose having the cuprammonium viscosity of the starting material of that employed in our process. In the case of etherifying high viscosity pulps, the reaction time may be as much as 12 hours, especially with the lower etherification temperatures. The following examples are specific illustrations of the preparing of cellulose ethers having a viscosity of 5000–100,000 centipoises in accordance with my invention:

Example I 150 lbs. of wood pulp, having a 2½% cuprammonium viscosity of 35 centipoises, was soaked in 50% aqueous sodium hydroxide for approximately 4 hours. The mass was then centrifuged and an alkali cellulose cake of 688 lbs. was obtained. This alkali cellulose was broken up and placed in an autoclave with 1400 lbs. of ethyl chloride and the mass was maintained at 110° C. for 8 hours. The autoclave was then cooled and a heavy alkaline dope resulted. This dope was thinned with acetic acid and precipitated in warm water. The precipitate, which was ethyl cellulose, was washed and dried. The product was found to have an ethoxyl content of 42.9% and a viscosity of 32,000–32,200 centipoises in a 10% solution in toluene-ethanol (2:1) at 25° C.

Example II

The procedure of Example I was repeated except that the alkali cellulose was only centrifuged down to 703 lbs. and the ethylation reaction was run for 12 hours at 100° C. A heavy alkaline dope was obtained. The ethyl cellulose, which was precipitated therefrom, was found to have an ethoxyl content of 43.8% and a viscosity of 42,600 centipoises.

Example III 150 lbs. of wood pulp, having a viscosity of 260 centipoises, was soaked in 50% aqueous alkali for about 4 hours and then centrifuged to 680 lbs. The alkali cellulose was broken up and placed in an autoclave with 1840 lbs. of ethyl chloride. The ethylation was conducted for 4 hours at 120° C. The ethyl cellulose obtained therefrom was found to have an ethoxyl content of 43.4% and a viscosity of 96,600 centipoises.

Example IV 150 lbs. of wood pulp, having a viscosity of 260 centipoises, was soaked in 50% aqueous sodium hydroxide for 4 hours and then centrifuged to 700 lbs. 150 lbs. of powdered solid sodium hydroxide was added to the alkali cellulose. It was then ethylated with 1840 lbs. of ethyl chloride for 4 hours at 120° C. The ethyl cellulose obtained had an ethoxyl content of 48.2% and a viscosity of 36,500 centipoises.

Example V 150 lbs. of wood pulp of 260 centipoises was soaked in 50% aqueous sodium hydroxide for 4 hours and then centrifuged to 715 lbs. 200 lbs. of powdered solid sodium hydroxide was added to the alkali cellulose. It was then broken up in an autoclave with 1840 lbs. of ethyl chloride and the ethylation was carried out for 8 hours at 120° C. The ethyl cellulose obtained had an ethoxy content of 49.5% and a viscosity of 19,950 centipoises.

Example VI 150 lbs. of wood pulp of 260 centipoises was soaked in a 50% aqueous alkali, as above, and then centrifuged to 700 lbs. 100 lbs. of powdered sodium hydroxide was added to the alkali cellulose. It was then broken up and placed in an autoclave with 1840 lbs. of ethyl chloride which was maintained at 120° C. for 5 hours. The ethyl cellulose formed had an ethoxy content of 46.5% and a viscosity of 69,000 centipoises.

Example VII 150 lbs. of cotton linters, having a viscosity of 20.5 centipoises, was soaked in 40% aqueous sodium hydroxide for 4 hours. The mass was then centrifuged to 713 lbs. and 110 lbs. of sodium hydroxide, in the form of small pellets, was added thereto. The alkali cellulose was broken up and placed in an autoclave with 1840 lbs. of ethyl chloride which was maintained at 110° C. for 6 hours. The ethyl cellulose formed had an ethoxy content of 44.3% and a viscosity of 5,200 centipoises.

Example VIII 150 lbs. of cotton linters, having a viscosity of 20.5 centipoises, was soaked in 50% aqueous sodium hydroxide for 6 hours. The mass was then centrifuged to 624 lbs. The alkali cellulose was broken up and placed in an autoclave with 1400 lbs. of ethyl chloride and the whole was maintained at 110° C. for 5 hours. The resulting ethyl cellulose had an ethoxy content of 43.3% and a viscosity of 7000 centipoises.

Example IX 150 lbs. of cotton linters, having a viscosity of 80 centipoises, was soaked in 50% alkali for 6 hours. It was then centriged to 597 lbs. and 110 lbs. of 50% alkali was added thereto. The alkali cellulose was broken up and placed in an autoclave with 1840 lbs. of ethyl chloride, the whole being maintained at 120° C. for 5 hours. The resulting ethyl cellulose had an ethoxy content of 43% and a viscosity of 23,500 centipoises.

Example X 150 lbs. of cotton linters, having a viscosity of 175 centipoises, was soaked in 50% aqueous alkali for 4 hours. It was then centrifuged to 785 lbs. and 130 lbs. of small pellets of sodium hydroxide were mixed therewith. The mass was broken up and placed in an autoclave with 1840 lbs. of ethyl chloride. The whole was maintained at 120° C. for 4 hours. The resulting product had an ethoxy content of 45.1% and a viscosity of 60,600 centipoises.

Example XI 150 lbs. of cotton linters, having a viscosity of 175 centipoises, was soaked in 50% alkali for 4 hours and centrifuged to 800 lbs. The alkali cellulose was mixed with 200 lbs. of small pellets of sodium hydroxide. The mass was then broken up and placed in an autoclave with 1840 lbs. of ethyl chloride. The ethylation was carried out at 120° C. for 5 hours. The resulting ethyl cellulose had an ethoxy content of 47.9% and a viscosity of 13,900 centipoises.

In the above examples, the alkali employed was sodium hydroxide. Obviously other alkalies of like nature, such as potassium hydroxide, could be employed. The ethyl cellulose obtained in each case was separated from its dope by precipitating in water, usually warm, and then washed and dried. In the cases of the higher viscosity ethers when the dope was quite viscous, it was diluted with acetic acid to thin it down to a point where it could be readily handled. The viscosities of the ethers referred to herein are to be understood to be the viscosities of a 10% solution of the ethers in toluene-ethanol (2:1) at 25° C.

As pointed out above, the high viscosity ethers, such as prepared for the first time by our process, are eminently suitable for the preparation of transparent films. It is preferred to employ ethers having at least 42% ethoxy because they offer a better resistance to the effect of moisture although if a lessened moisture resistance is not objectionable ethers having a lower ethoxy content may be used. If the amount of combined ethoxyl is too high, loss of strength results so that is preferred where strength is an important feature that a cellulose ether having not more than 48% ethoxy content be used. For instance, a cellulose ether having a viscosity of 20,000–50,000 centipoises was dissolved in a mixture of 90 parts of ethylene dichloride and ten parts of ethyl alcohol and was coated out upon a film forming surface. A product of good tensile strength was obtained. The following tabulation illustrates the consistent increase in tensile strength over film prepared from cellulose ethers having viscosities and ethoxy contents corresponding to those of the ethers disclosed in the prior art.

| Ethoxyl | Toluene-ethyl alcohol viscosity | Tensile strength |
|---|---|---|
| Per cent | Centipoises | |
| 48.5 | 132 | 10.5–10.7 |
| 47.45 | 1,350 | 11.0 |
| 48.55 | 1,610 | 10.3–10.5 |
| 42.30 | 680 | 12.7–13.9 |
| 42.7 | 115,500 | 21.9–22.7 |
| 43.2 | 20,600 | 15.8–17.9 |
| 43.8 | 60,800 | 16.7–17.7 |
| 46.2 | 34,900 | 18.1–20.9 |

Due to the tensile strength of these ethers they are suitable for use in reinforcing materials or for laminating. For instance in the making of safety glass, a sheet, preferably transparent, of a high viscosity cellulose ether is sandwiched between two sheets or plates of glass, using an adhering agent such as gelatin to cause a bond between these sheets.

These cellulose ethers may be used for reinforcing fibrous materials such as fabric, paper and the like by either impregnating the material with a solution of the ether and then removing the solvent or by laminating with the ether such as in the form of sheets.

The high viscosity ethers are suitable for the preparation of artificial yarn which has good strength both wet and dry due to the good tensile strength of these ethers and their resistance to moisture. Molded products may also be prepared from these ethers as these products are strong and lack brittleness as compared with cellulose ethers disclosed in the prior art. It is preferred that a substantial amount of plasticizer be intimately mixed with the ether such as up to 50% or even more where compatible, based on the weight of the ether.

Although it is preferred in our process to use ethyl chloride, other ethyl halides, such as the bromide or iodide, also admit of use. In practical operation the chloride is preferred due mainly to economic considerations. Whenever the term alkali is used herein, it refers either to potassium hydroxide or sodium hydroxide or any of the alkali metal hydroxides which will render the cellulose in proper condition for etherifying.

We claim:

1. A process for preparing high viscosity cellulose ethers which comprises soaking cellulose having a cuprammonium viscosity of 20–5000 cps. in a concentrated aqueous solution of caustic alkali, removing aqueous alkali therefrom by pressure and without exposing the mass to the air for a sufficient time to detrimentally act on the cellulose, treating it with an etherifying bath comprising a lower alkyl halide in the presence of 1.5–5 parts of caustic alkali for every part of cellulose present, sufficient alkali being present to maintain an alkaline condition throughout the etherification, the etherifying bath substantially completely dissolving the cellulose ether formed, the treatment being within a time (at least 3½ hours) and at a temperature which will not reduce the toluene-ethyl alcohol viscosity of the ether below 5000 centipoises.

2. A process for preparing high viscosity cellulose ethers which comprises soaking cellulose having a cuprammonium viscosity of 20–5000 cps. in a concentrated aqueous solution of caustic alkali, removing aqueous alkali therefrom by pressure and without exposing the mass to the air for a sufficient time to detrimentally act on the cellulose, treating it with an etherifying bath comprising a lower alkyl halide in the presence of 1.5–5 parts of caustic alkali for every part of cellulose present, sufficient alkali being present to maintain an alkaline condition throughout the etherification, the etherifying bath substantially completely dissolving the cellulose ether formed, the treatment being at a temperature between 100–130° C. selected in accordance with the viscosity of the cellulose used and for a time which will not reduce the toluene-ethyl alcohol viscosity of the ether below 5000 centipoises.

3. A process for preparing high viscosity ethyl cellulose which comprises soaking cellulose having a cuprammonium viscosity of 20–5000 cps. in an aqueous solution of caustic alkali of at least 40% concentration, removing aqueous alkali therefrom by pressure and without exposing the mass to the air for a sufficient time to detrimentally act on the cellulose, treating with an etherifying bath comprising ethyl chloride and a solvent for the ethyl cellulose formed therein in the presence of 1.5-5 parts of caustic alkali for every part of cellulose present, sufficient alkali being present to maintain an alkaline condition throughout the etherification, the treatment being within a time and at a temperature which will not reduce the toluene-ethyl alcohol viscosity of the ether below 5000 centipoises.

4. A process for preparing high viscosity cellulose ethers which comprises soaking cellulose having a cuprammonium viscosity of 20-5000 cps. in a concentrated aqueous solution of caustic alkali, removing aqueous alkali therefrom by pressure and without exposing the mass to the air for a sufficient time to detrimentally act on the cellulose, treating it with an etherifyinig bath comprising a lower alkyl halide in the presence of 1.5-5 parts of caustic alkali for every part of cellulose present, sufficient alkali being present to maintain an alkaline condition throughout the etherification, the etherifying bath substantially completely dissolving the cellulose ether formed, the treatment being for 4-5½ hours at a temperature which will not reduce the toluene-ethyl alcohol viscosity of the ether below 5000 centipoises.

5. A process for preparing high viscosity ethyl cellulose which comprises soaking cellulose having a cuprammonium viscosity of 20-5000 cps. in 50% aqueous caustic alkali for 4 hours, removing aqueous alkali by centrifuging and without exposing the mass to the air for a sufficient time to detrimentally act on the cellulose, treating it with an etherifying bath comprising about 12 parts of ethyl chloride in the presence of approximately 2 parts of caustic alkali for every part of cellulose present, the etherifying bath substantially completely dissolving the cellulose ether formed, the treatment being for 4-5½ hours at a temperature selected in accordance with the viscosity of the cellulose used so that the toluene-ethyl alcohol of the ethyl cellulose will not be below 5000 centipoises.

6. A process for preparing high viscosity ethyl cellulose which comprises soaking cellulose having a cuprammonium viscosity of 20-5000 cps. in a concentrated aqueous solution of caustic alkali, removing aqueous alkali therefrom by pressure and without exposing the mass to the air for a sufficient time to detrimentally act on the cellulose, treating with an etherifying bath comprising an ethyl halide and dioxan, as the solvent for the cellulose ether formed therein, in the presence of 1.5-5 parts of caustic alkali for every part of cellulose present, sufficient alkali being present to maintain an alkaline condition throughout the etherification, the treatment being within a time and at a temperature which will not reduce the toluene-ethyl alcohol viscosity of the cellulose ether below 5000 centipoises.

7. A process for preparing high viscosity cellulose ethers which comprises soaking cellulose having a cuprammonium viscosity of 20-5000 cps. in a concentrated aqueous solution of caustic alkali, removing aqueous alkali therefrom by centrifuging and without exposing the mass to the air for a sufficient time to detrimentally act on the cellulose, treating it with an etherifying bath comprising a lower alkyl halide in the presence of 1.5-5 parts of caustic alkali for every part of cellulose present, sufficient alkali being present to maintain an alkaline condition throughout the etherification, the etherifying bath substantially completely dissolving the cellulose ether formed, the treatment being within a time (at least 3½ hours) and at a temperature which will not reduce the toluene-ethyl alcohol viscosity of the ether below 5000 centipoises.

8. A process for preparing high viscosity cellulose ethers which comprises soaking cellulose having a cuprammonium viscosity of 20-5000 cps. in a concentrated aqueous solution of caustic alkali, removing aqueous alkali therefrom by pressure and without exposing the mass to the air for a sufficient time to detrimentally act on the cellulose, treating it in the presence of 1.5-5 parts of caustic alkali per part of cellulose with an etherifying bath comprising a quantity of ethyl chloride which is sufficient with the alcohol formed therefrom during the etherification to dissolve the cellulose ether product, the treatment being within a time (at least 3½ hours) and at a temperature which will not reduce the toluene-ethyl alcohol viscosity of the ether below 5000 centipoises.

9. In a single stage etherification of alkali cellulose containing between about 1½ and about 5 parts of alkali and a moisture content above the lowest possible but not more than about 2.5 parts of water per part of cellulose by weight, the method which consists in heating the said alkali cellulose with at least 6 parts by weight of a lower alkyl halide per part of cellulose present, at a reaction temperature between about 100° C. and about 130° C. until at least approximately 81.7% of the alkali present has been neutralized by reaction with the said alkyl halide, discontinuing the reaction before the mass loses its alkalinity and recovering the so-produced lower alkyl ether of cellulose having an alkoxy content between about 43 and 49.5%, said ether being characterized by its ability to deposit from solution stronger, more flexible and more stable films than do similar ethers prepared under reaction conditions such that the alkyl halide is not in excess over the alkali present and such that the alkali is substantially neutralized.

10. In a single stage etherification of alkali cellulose containing between about 1½ and about 5 parts of alkali and a moisture content above the lowest possible but not more than about 2.5 parts of water per part of cellulose by weight, the method which consists in heating the said alkali cellulose with at least 6 parts by weight of ethyl chloride per part of cellulose present, at a reaction temperature between about 100° C. and about 130° C. until at least approximately 81.7% of the alkali present has been neutralized by reaction with the said ethyl chloride, discontinuing the reaction before the mass loses its alkalinity and recovering the so-produced lower alkyl ether of cellulose having an ethoxy content between about 43 and 49.5%, said ether being characterized by its ability to deposit from solution stronger, more flexible and more stable films than do similar ethers prepared under reaction conditions such that the ethyl chloride is not in excess over the alkali present and such that the alkali is substantially neutralized.

11. In a single stage etherification of alkali cellulose containing between about 1½ and about 4 parts of alkali and correspondingly a moisture content above the lowest possible but not more than about 2 parts of water per part of cellulose by weight, the method which consists in heating the said alkali cellulose with at least 6 parts by weight of a lower alkyl halide per part of cellulose present, at a reaction temperature between about 100° and about 130° C., only until between about 81.7 and about 95 per cent of the alkali present has been neutralized by reaction with the said alkyl halide, discontinuing the reaction before the mass loses its alkalinity and recovering the so-produced lower alkyl ether of cellulose having an alkoxy content between about 43.3 and 47.9 per cent, said ether being characterized by its ability to deposit from solution stronger, more flexible and more stable films than do similar ethers prepared under reaction conditions such that the alkyl halide is not in excess over the alkali present and such that the alkali is substantially neutralized.

12. In a single stage etherification of alkali cellulose containing between about 1½ and about 4 parts of alkali and between about 1.58 and about 2 parts of water per part of cellulose by weight, the method which consists in heating the said alkali cellulose with at least 6 parts by weight of ethyl chloride per part of cellulose present, at a reaction temperature between about 100° and about 130° C. only until between about 81.7 and about 95 per cent of the alkali present has been neutralized by reaction with the said ethyl chloride, discontinuing the reaction before the mass loses its alkalinity and recovering the so-produced ethyl cellulose having an ethoxy content between about 43.3 and 47.9 per cent, said ether being characterized by its ability to deposit from solution stronger, more flexible and more stable films than do similar ethers prepared under reaction conditions such that the alkyl halide is not in excess over the alkali present and such that the alkali is substantially neutralized.

CHARLES R. FORDYCE.
JOSEPH GAIL STAMPFLI.